Figure 1:
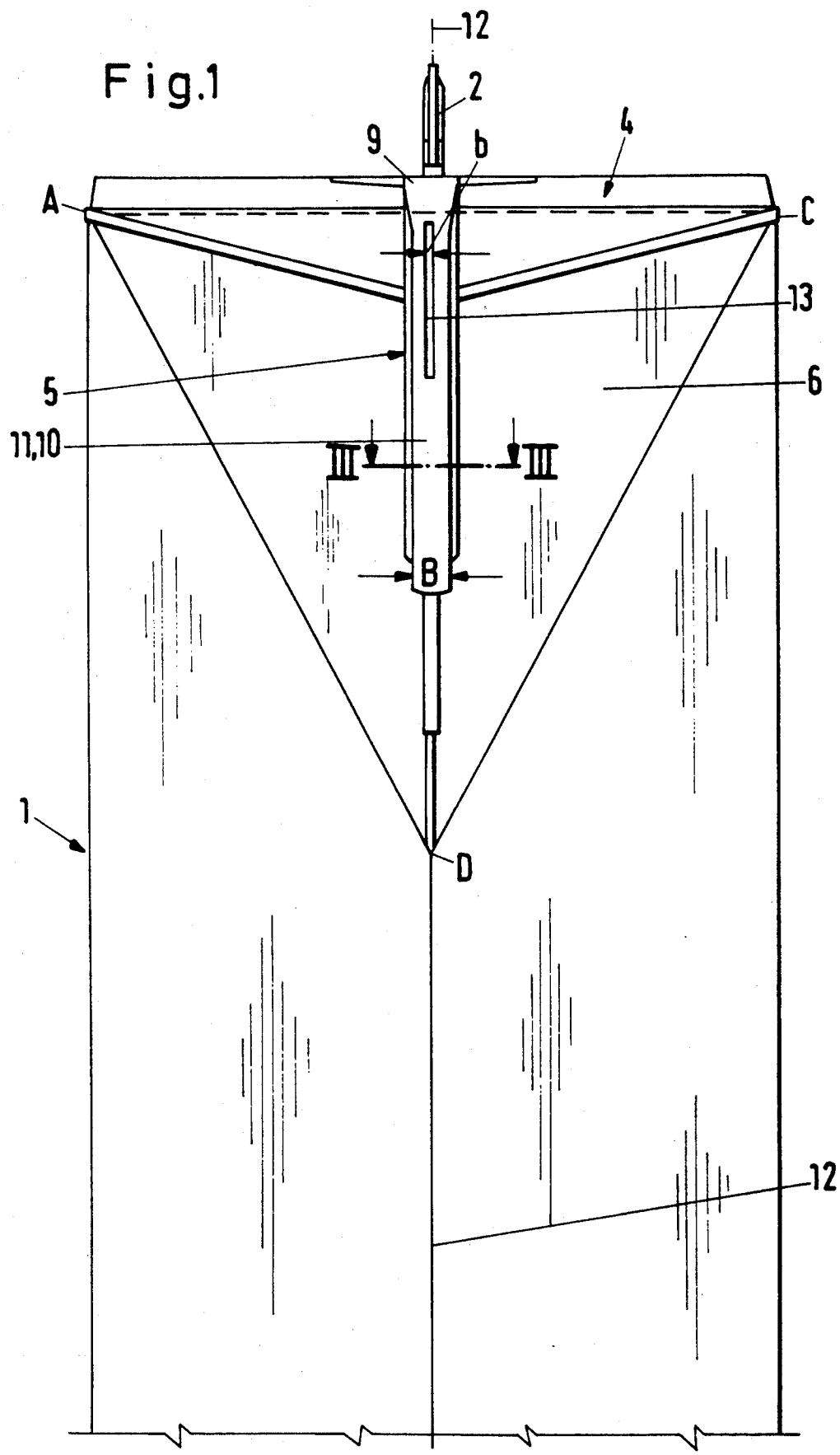

United States Patent [19]

Reil

[11] Patent Number: 5,143,280
[45] Date of Patent: Sep. 1, 1992

[54] PACKAGE FOR FLOWABLE CONTENTS WITH AN INTEGRALLY MOULDED HANDLE HAVING MOULD-ENGAGING STABILIZING MEANS

[75] Inventor: Wilhelm Reil, Bensheim, Fed. Rep. of Germany

[73] Assignee: Tetra Pak Holdings S.A., Lausanne, Switzerland

[21] Appl. No.: 823,071

[22] Filed: Jan. 14, 1992

Related U.S. Application Data

[63] Continuation of Ser. No. 528,124, May 22, 1990, abandoned.

[30] Foreign Application Priority Data

May 31, 1989 [DE] Fed. Rep. of Germany ....... 3917609

[51] Int. Cl.$^5$ .................................................. B65O 5/46
[52] U.S. Cl. .......................... 229/117.23; 229/125.11; 229/125.14; 229/125.04
[58] Field of Search ...................... 229/117.09, 117.23, 229/125.11, 125.14, 125.09, 125.08, 125.04

[56] References Cited

U.S. PATENT DOCUMENTS

| | | | |
|---|---|---|---|
| 3,250,562 | 5/1966 | Frasure et al. | 229/117.23 |
| 3,570,744 | 3/1971 | Smith | 229/117.23 |
| 4,718,598 | 1/1988 | Pupp et al. | 229/117.23 |
| 4,804,134 | 2/1989 | Reil | 229/117.23 |

Primary Examiner—Joseph Man-Fu Moy
Attorney, Agent, or Firm—Brown, Martin, Haller & McClain

[57] ABSTRACT

A liquids package is described which has, formed by a longitudinal sealing seam, a tube at the ends of which bottom and top (4) are provided, of which the top (4) consists partially of thermoplastics synthetic material with no carrier material, is injection moulded along the top edge of the tube and comprises a pourer device (3), the tube consisting of synthetic plastics coated carrier material, the integrally moulded top (4) comprising at least three corners and, enclosing an angle, two planes of which the first plane of the top is parallel with the plane of the bottom while the second plane is at least partially formed from the tube material and is connected to a handle (5) having an upper horizontal (9) and a rear vertical web (10) diametrically opposite the pourer edge (7) and which engage around the handle aperture and which is connected to the top (4) and which together therewith is integrally moulded on the second plane within the parallelepiped outer contours of the package.

In order to improve such a package so that a higher quantity of integrally moulded units per unit of time can be produced without damage to the handle upon removal from the mould, the package comprises the feature that the vertical web (10) is provided with at least one holding cut-out (13) on its rear face (11).

3 Claims, 4 Drawing Sheets

PACKAGE FOR FLOWABLE CONTENTS WITH AN INTEGRALLY MOULDED HANDLE HAVING MOULD-ENGAGING STABILIZING MEANS

This is a continuation of application Ser. No. 07/528,124, filed May 22, 1990 now abandoned.

The invention relates to a package for flowable contents and with, formed by at least one longitudinal sealing seam, a tube at the ends of which there are a bottom and a top, of which the top consists at least partially of thermoplastics synthetic material with no carrier material, is integrally moulded on and along the top edge of the tube consisting of carrier material, e.g. cardboard, coated on at least one side with a thermoplastics synthetic material.

Furthermore, the invention relates to a method of integrally moulding a handle consisting of thermoplastics synthetic material onto the synthetic plastics top of a package and in which the mould cavity between inner and outer mould parts is filled with liquid synthetic plastics material, is cooled and after which the moulding is removed from the mould.

Furthermore, the invention relates to an apparatus for the integral moulding of a handle in the afore-described manner and this apparatus comprises a mould space closable by two movable outer mould parts and of which one boundary face closes off the rear face of the web of the handle which is to be moulded on.

Packages of the type mentioned at the outset are already known. For ready stackability, the prior art package has the integrally moulded top provided with at least three corners and, enclosing an angle, two planes of which the first plane of the top is parallel with the plane of the bottom while the second plane consists at least partially of the tube material and is connected to a handle having an upper horizontal web and a rear vertical web diametrically opposite the pourer edge and in that they engage around the handle aperture, the handle being connected to the top with which it is integrally moulded on the second plane within the parallelepiped outer contours of the package. By accommodating the handle within the outer contours of the package, this latter can be readily stacked, is storable and can also, in a practical way, be packed in outer containers.

Such a package which is used in the main for storing, transporting and distributing milk, juices and like fluids is produced in large quantities on high-output machines on which 1000 to 1500 packages per hour are produced, filled and packed.

It is true that there are also available packages which have just synthetic plastics tops with no handle, but the above-described package with a handle integrally moulded on the top offers considerable handling advantages for the end user. For inexpensive production of the package, attempts have already been made in the manufacturing process to use as little synthetic plastics material as possible for making the top and the handle. It has already been possible to make the main surfaces of the top thin and the handles of prior art packages are so to speak largely hollow being constructed by a pattern of ribs, so that for the end user large areas are available which can be engaged by hand and finger while only relatively thin webs of synthetic plastics material provide the connection of the handle surfaces. There is so to speak a box-like profile of struts inside the handle.

Despite this profile-like construction of the handle, a man skilled in the art who is concerned with the production of such packages will appreciate that the handle as such contains a certain mass of synthetic plastics material which, after the handle has been integrally moulded on the top and the wall of the package, must be cooled and so removed from the mould that there is no fear of the handle becoming deformed, damaged or even destroyed in the process of mould removal. The output of a package-producing machine is frequently restricted by the process of moulding the handle and top on a paper tube. Inner and outer mould parts which engage around the tube on the one hand and the top area as well as the top with the handle on the other and which provide the mould space must be closed and, after the injection moulding of the synthetic plastics material, must also be opened again sufficiently wide that the package can be removed from the position under the injection moulding unit and passed on to further processing stations. It is therefore desirable to open the mould parts as quickly as possible and consequently to be able to remove the moulding from the mould as quickly as possible.

In those areas where the top is injection moulded onto the edges of the paper tube, the walls which consist only of thermoplastics material are held by the paper material. The stability of the still soft and warm newly injection moulded top is sufficient to remove from the mould parts the package with the integrally moulded top. The situation is different in the region of the handle which is quite a distance (2 to 5 and preferably about 1 to 3 cm) removed from the stiffening surfaces of the tube. If the outer mould parts with which mainly the handle is injection moulded are moved apart too soon, before the moulding itself has cooled sufficiently, then the handle would not have the necessary stability and would possibly remain clinging to one or other jaw of the tool and would be damaged or destroyed when removed from the mould. So far, a man skilled in the art has not succeeded in exceeding a certain output when producing such packages with an integrally moulded handle.

The object of the invention therefore is to provide a package of the type mentioned at the outset, a method of producing a package to hold flowable contents and an apparatus for integrally moulding a handle onto the top of such a package and by means of which a greater quantity of injection moulded units can be produced per unit of time with no damage to the handle when the package is removed from the mould.

For the package, the solution to the problem according to the invention is that the vertical web is straight and is provided on its rear surface with at least one holding cut-out. On the finished package, the holding cut-out can be seen on the handle, namely on the outside of its vertical web but neither the function of the handle nor the appearance of the package are adversely affected by this holding cut-out. Instead, a man skilled in the art will recognise the advantage of the new holding cut-out with which in fact the handle can be held in a desired position along a small surface when holding it from other sides is not possible. The term "small" surface is understood to imply a small proportion between the total outer surface of the handle and the surface formed by the holding cut-out. This proportion may be between 1 and 20% and preferably between 5 and 10%.

According to the invention, it is particularly advantageous thereby if the holding cut-out is a holding groove and has a width of 1/15 to 1/5 the width of the rear face of the vertical web and is disposed to extend vertically in the middle of the rear face. An inattentive end user might possibly be unaware of such a thin holding groove so that this structural refinement provides a supporting facility which is considerably advantageous to the manufacturer without the end user being disturbed by the groove-like holding recess either when purchasing the package or when using it. On the contrary, when positioning packages on conveyor belts, the new holding cut-out has the advantage that tools can more easily engage the package and carry out rotary displacements.

According to the invention, it is furthermore expedient if the rear face of the vertical web is flat and if the groove-like holding cut-out extends preferably substantially in the upper half which is towards the top end of the package. If a man skilled in the art, when removing the package from the mould, wants to manage to hold the handle firmly even at the moment when the synthetic plastics material has still not hardened through completely in the centre of the moulded mass, a gentle engagement of a finger-like holding element into the groove-like retaining cut-out is sufficient to carry out removal from the mould prematurely and prior to final hardening of the synthetic plastics mass, without the handle being bent over because it may be clinging to one of the jaws of the moulding tool. It has been found that by means of the new groove-like holding cut-out, it is possible to turn out a quantity of articles per unit of time which was hitherto unexpected, in practice about 3000 packages per hour.

According to the invention, the method of integrally moulding a handle of the aforementioned type is characterized in that the web of the handle which is remote from the centre of the package is held in position during removal from the mould by a holding part which is preferably small in relation to the handle as a whole and in that the web is subsequently also disengaged from the holding part. If the teaching according to the invention is respected, then a man skilled in the art will establish that the outer skin of the synthetic plastics mass is already firm in the region of the handle following the injection moulding process and after a relatively short cooling time, whereas the synthetic plastics mass has still not hardened out inside the handle area. However, it is in fact the outer skin which is important when, according to the considerations disclosed in the invention, the holding part is touched during removal of the web of the handle from the mould, the handle being kept stable and in position by this engagement, so that it retains its stiff construction even when the outer mould parts are moved apart from each other and perhaps even while the major part of the interior of the synthetic plastics mass of the handle is still soft. In this way, the cooling time can be shortened considerably during production and the outer mould parts which engage around the handle can be opened sooner. Therefore, time is saved during the injection moulding process and so the output of the package producing machine can be increased.

According to the invention, it is furthermore advantageous if the rear face of the handle web is, during removal from the mould, touched from outside by the finger-like holding part, the holding part being withdrawn in a sliding manner afterwards in relation to the rear face of the handle web. In the case of the rear flat surface of the vertical web of the handle, also the groove-like holding cut-out is straight and a finger-like holding part can be used for contacting the handle web from outside so long as the outer mould parts which engage around the moulding are moved apart from each other, i.e. during removal from the mould. Of course, it must be possible to remove the moulding completely from the mould and for this purpose, also the finger-like holding part cannot remain engaged with the web of the handle. Actually, the sliding withdrawal of a holding part in relation to the rear surface of the handle web permits of problem-free manufacture, removal from the mould and separation of the tool parts from the moulding.

The apparatus for integrally moulding the package with the features mentioned at the outset comprises a mould space which can be closed by two movable outer mould parts, the inner mould parts being disregarded at this stage, although it goes without saying that the mould space must likewise be closed off on the inside by the inner mould parts. According to the invention, however, what is important in the main are the movable outer mould parts which define a boundary surface which closes off the rear face of the web of the handle which is to be moulded on. This boundary face is therefore to be understood as a part of the outer mould parts, because the boundary face engages at least partially around the handle. Such an apparatus is, then, according to the invention characterised in that the boundary face which bears against the web of the handle has passing through it a holding part which is offset in relation to the boundary face and which is driven so that it moves in relation to at least one of the outer mould parts. A man skilled in the art knows that the moulding can be reduced from the mould if for example the two outer mould parts are moved apart from each other and away in relation to the inner mould part with the moulding. Also the boundary face of the tool which partly forms the handle belongs to the outer mould parts and is removed. During movement of the outer mould parts away, the handle is according to the invention held in place by engagement with the holding part so that it does not bend. The holding part is therefore movable in relation to the outer mould parts, these latter being opened on the one hand so that they can be removed from the moulding while the holding part remains in its position and keeps the handle stable, after which, on the other hand, after movement of the outer mould parts away, finally also the holding part has to be removed from the moulding. This is carried out by the above-mentioned sliding withdrawal in the case of a handle with a straight web. Rolling movements, circular sliding movements and the like can also be imagined as a means of removing the holding part.

According to the invention, the holding part may also comprise a groove, a pin or a plate. In mind here are for example holes in the outer surface of the handle web through which the holding part engages, taking the form of one or a plurality of fingers. The holding part can however also comprise a groove so that the moulding will correspondingly comprise a small bead. According to the invention, however, it is particularly expedient to use a plate disposed between the outer mould parts at the correct location alongside the boundary face. Such an embodiment must be regarded as particularly preferable and is according to the invention characterised in that the boundary face of the mould space is substantially flat and is rectangular in plan view and in that the holding part is constructed as a flat plate fixed on an oscillatingly movable carrier and having a centrally disposed bead which projects through the boundary surface into the mould cavity. This bead lies like a rib on the outermost surface of the flat plate. Such a bead-like rib which, when viewed from the tool, projects outwardly then defines the retaining groove described hereinabove in connection with the package. The carrier is adapted to move upwardly and downwardly, parallel with the preferably vertical web of the handle, so that the rib-like bead or the retaining part can likewise be moved upwardly and downwardly with it, being for example adapted to be moved away upwardly from the inner mould part (the mandrel of a mandrel wheel), when the holding part is disengaged from the moulding and vice versa.

The movement of a plate, with or without a bead, or of a pin or such like in relation to the adjacent outer mould parts is also readily possible even while the heavy duty machine is in operation, since there is no disturbing friction present between the movable tool parts. Instead, according to the invention, a gap of about 0.05 mm is provided and it has been demonstrated in practice that no wear and tear of any kind nor any breakdowns are caused by friction. It goes without saying that a man skilled in the art knows that the mould space for the moulding process must be closed on the outside in a sealing-tight manner. It has however been found that if such narrow gaps of the order of just 0.05 mm are used, then there is no need to fear the hot liquid synthetic plastics material escaping outwardly through the gap.

Figure 2:
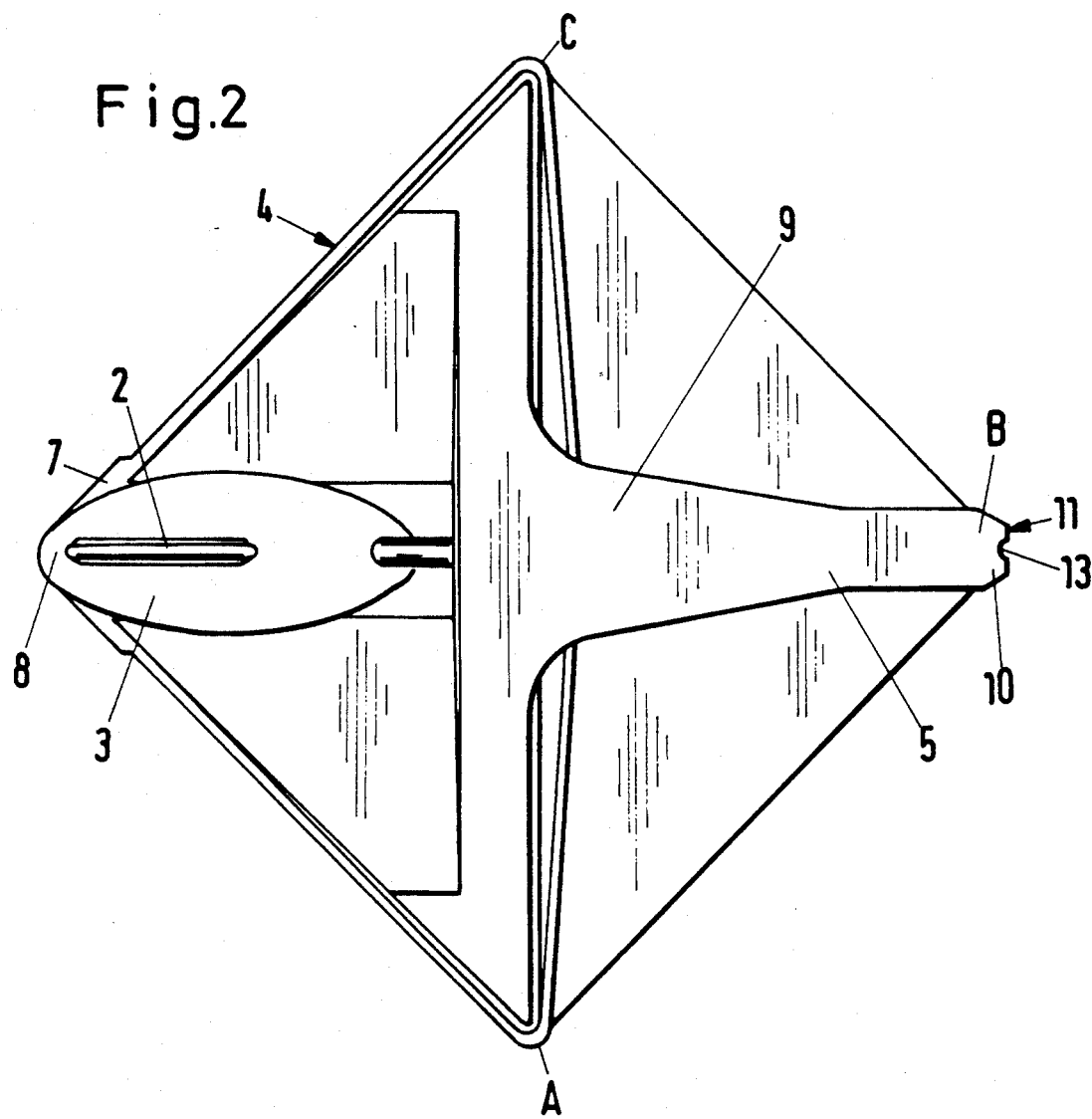
Figure 3:
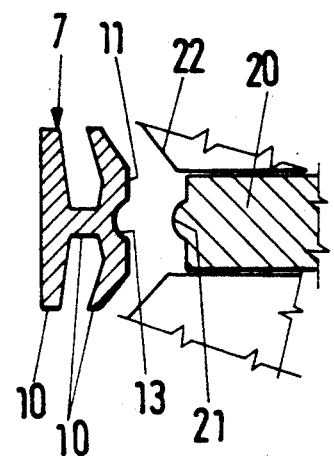
Figure 4:
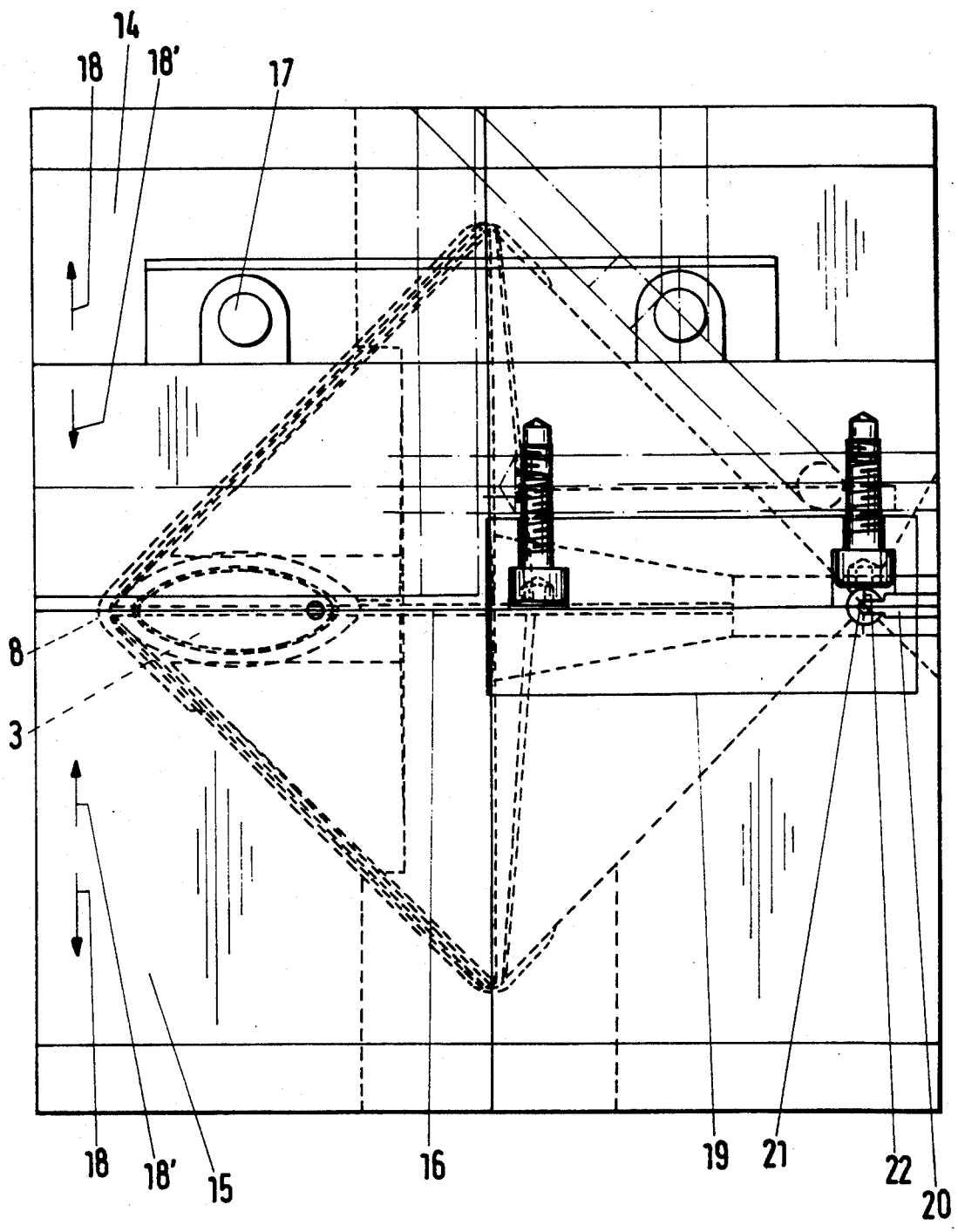
Figure 5:
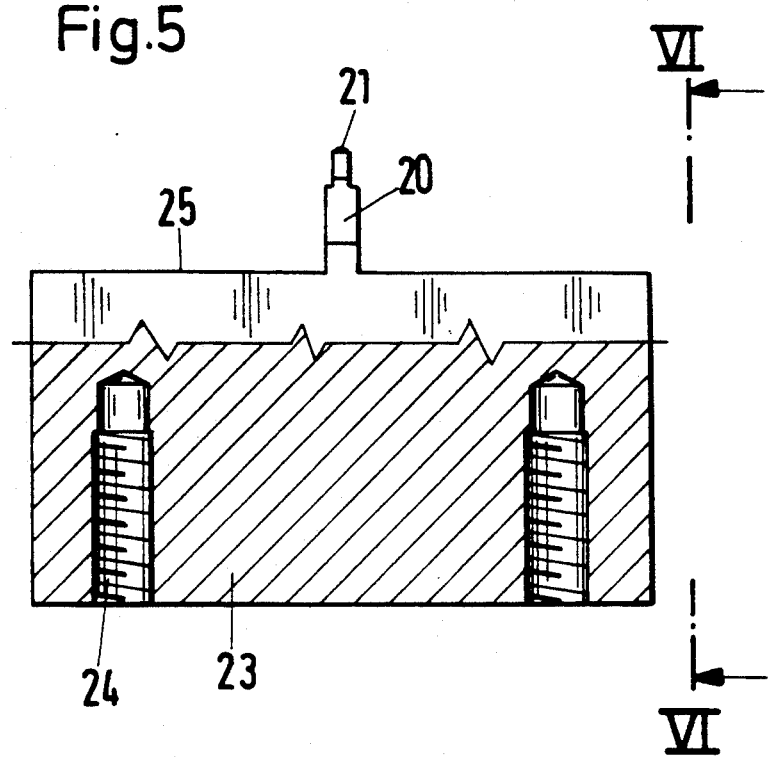
Figure 6:
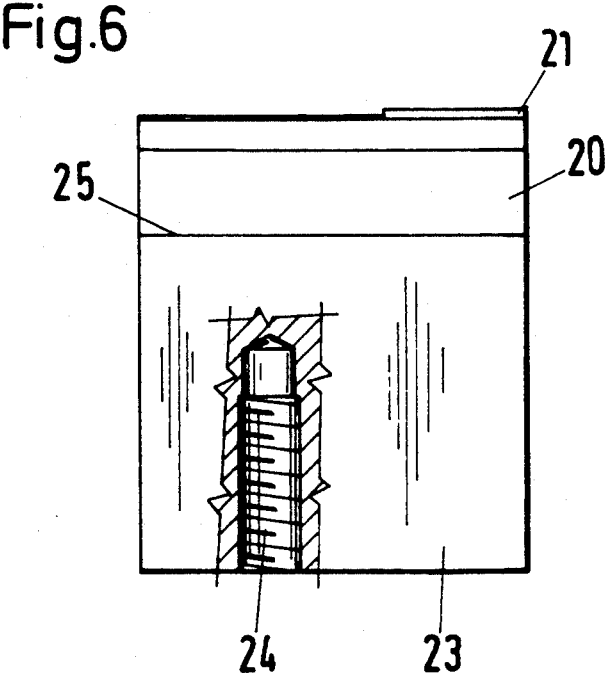

Further advantages, features and possible applications of the present invention will emerge from the ensuing description of preferred examples of embodiment in conjunction with the accompanying drawings, in which:

FIG. 1 is a view showing the rear of a package with a cross-sectionally tetragonal tube and with a top and handle integrally moulded on, FIG. 2 is a plan view of the package shown in FIG. 1, FIG. 3 is a broken-away cross-sectional view taken on the line III—III in FIG. 1 after removal of the package from the mould, FIG. 4 is a plan view of two outer mould parts for producing a top as shown in FIG. 2, FIG. 5 is a partially broken-away carrier with a plate fixed thereon and fitted with a holding part and FIG. 6 is a view of the carrier seen in a direction as indicated by the arrows VI—VI in FIG. 5.

The package can be seen essentially in FIG. 1 and its top can be seen in plan view in FIG. 2. It is a package to hold liquids and of which the synthetic plastics coated paper tube 1 is tetragonal in cross-section. At the bottom, the tube 1 is cut off because the structure of the tetragonal bottom, for example as a folded closure, is not vital here for the description of the embodiment. Within the outer contours of the package from which protrudes only a gripper ring 2 of a tear-open tab 3 and which can be folded over into the region within the outer contours for transport purposes there is the synthetic plastics top generally designated 4 and which has a handle 5 integrally moulded onto it. The handle is located in a tetrahedral space within the outer contours defined by three corners A, C, D of a common surface 5 of the package.

In plan view, according to FIG. 2, there is shown on the left in the region of the pourer device with the tear-open tab 3 and on the outside, at the tip of the pourer edge 7 the spout tip 8 and if one looks from the opposite side, in other words from right to left in FIG. 2, then one sees the package in FIG. 1.

Integrally moulded onto the top 4, the handle 5 comprises an upper horizontal web 9 and diametrically opposite the pourer edge 7 a vertical web 10 which is substantially straight. It is true that in the view shown in FIGS. 1 and 2, particularly FIG. 2, this vertical web 10 has a rear flat face 11 but from the cross-sectional view in FIG. 3 it can however be seen that the overall construction of the handle 5 and particularly of its vertical web 10 is profile-like. Thus, there is a saving on material and shrinkage during setting of the synthetic plastics material is less likely to produce deformations.

In an extension of the lower middle line 12 in the tube of the package according to FIG. 1 and extending upwardly, this centre passes both through the rear face 11 of the web 10 and also beyond it upwardly into the gripper ring 2 where the line 12 is shown once again as a dash-dotted line. Along this centre 12 there is in the rear face 11 of the vertical web 10 a groove-like holding cut-out 13 substantially in the upper half which is towards the top end of the package, as FIG. 1 shows. The width b of this groove-like holding cut-out 13 amounts to about 1/5 the width B of the rear face 11 of the web 10. If this face 11 is about 10 mm wide, then the width of the groove-like holding cut-out 13 is 2 mm wide.

The upper part of the tool with the two outer mould parts 14 and 15 is shown in FIG. 4. The continuous separating line between the two outer mould parts is designated 60. These are so movable via fixing elements 17 that they can be moved apart from each other in the direction of the arrow 18 for removal of the package from the mould and conversely they can be moved in the opposite direction towards one another along the arrow 18' to form the mould space which is not described in greater detail. The insert 19 is used for mounting the special moulds for the handle 7. At the right-hand edge of FIG. 4, in the centre, it is possible to see how a bead 21 mounted centrally on a plate 20 projects like a rib through the boundary surface 22 of the tool and into the mould space.

The bead-like rib 21 is also shown in FIG. 3 as being mounted at the front of the plate 20.

In plan view and in side view, FIGS. 5 and 6 show the carrier 23 which is fixed by screws 24 on a (not shown) upper head plate of the tool. Projecting centrally from the front face 25 of the carrier 23 is the plate 20 at the top of which the bead-like rib 21 is provided.

In operation, the tube is fitted on a mandrel (not shown) of a mandrel wheel and which serves as the inner mould part and is so moved under the injection moulding unit that the outer mould parts 14 and 15 on the one hand and the plate 20 with the bead rib 21 on the other moves together and form the mould cavity into which a liquid synthetic plastics material is forced under pressure. This causes the mould cavity to fill and forms the top 4 shown in FIG. 2, together with the handle 5. Once at least the outer skin of the synthetic plastics mass has set, the outer mould parts 14, 15 can be moved apart in the direction of the arrow 18 while the bead rib 21 remains engaged in the groove-like holding cut-out 13 so that the handle 5 is kept stable and cannot be deformed by removal from the mould. Cooling of the now exposed synthetic plastics material proceeds quickly so that already after a short time from the outer mould parts 14, 15 moving apart, the carrier 23 together with the bead rib 21 can be withdrawn in sliding fashion vertically upwardly in the direction of the longitudinal central axis 12 of the package. The package with the top is now completely disengaged and can be moved into any other position.

I claim:

1. In a package for flowable contents comprising a tube (1) at the ends of which there are a bottom and a top (4); the top (4) consisting at least partially of thermoplastic synthetic material with no carrier material, and being integrally moulded onto and along the top edge of the tube (1), said tube consisting of carrier material coated on at least one side with a thermoplastic synthetic material; the integrally moulded top (4) having at least three corners, a pouring edge (7) and two planes forming an angle, of which the first plane of the top (4) is parallel with the bottom of the tube while the second plane (6) consists at least partially of the tube material and is connected to a handle (5); the handle having an upper horizontal member (9) and a rear vertical member (10) diametrically opposite the pouring edge, said rear vertical member having a front face and a rear face, said members (9, 10) and said second plane forming a gripper aperture centrally thereof and abutting said front face of said rear vertical member; said handle (5) formed of said members (9, 10) being connected to the top (4) by being integrally moulded to the second plane within the vertical outer contours of the package: the improvement comprising said vertical member (10) of said handle being straight and having on said rear face (11) opposite said gripper aperture at least one retaining groove (13).

2. A package according to claim 1 further comprising said retaining groove (13) having a width (b) of 1/15 to 1/5 the width (B) of the rear face (11) of said vertical member (10) and being disposed to extend vertically in the middle (12) of said rear face (11) of said vertical member (10).

3. A package according to claim 1 further comprising the rear face (11) of the vertical member (10) being flat and said retaining groove (13) being disposed substantially in the upper top half of the rear face of said vertical member (10).

* * * * *